Patented June 11, 1940

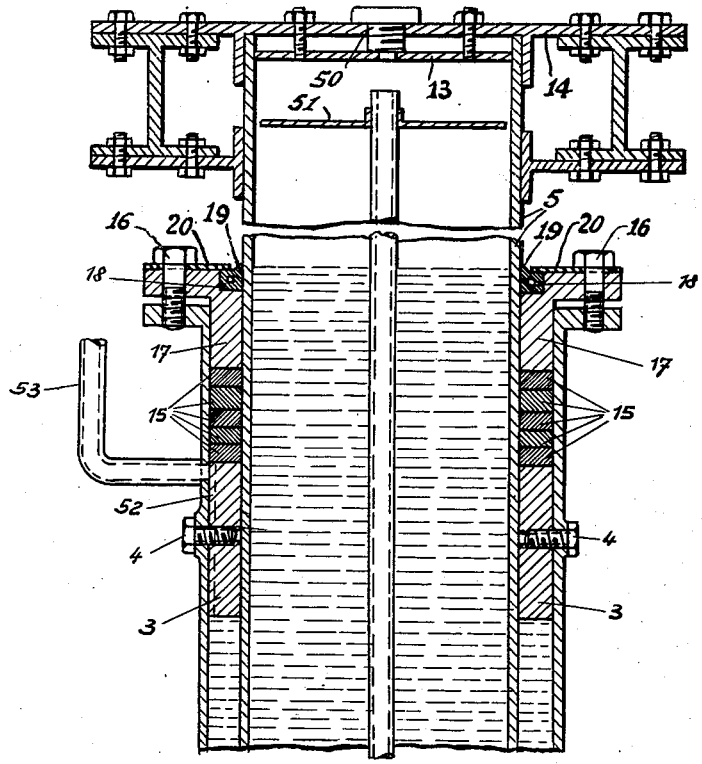
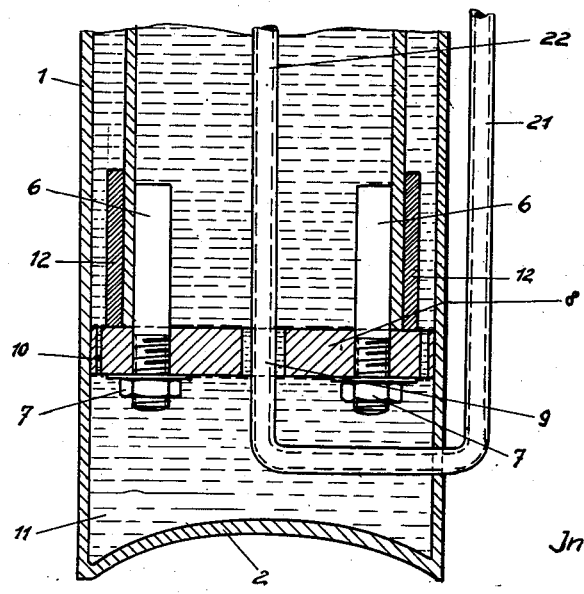

2,204,365

UNITED STATES PATENT OFFICE 2,204,365

LIFTING PLATFORM

Karl Klemm, Dresden, Germany

Application November 30, 1937, Serial No. 177,323
In France October 28, 1936

1 Claim. (Cl. 121—46)

This invention relates to a lifting platform for hydraulic and pneumatic operation, which serves particularly for raising vehicles.

The platform is operated by means of compressed air and substantially comprises an outer cylinder which after installation of the outfit is arranged in the ground or in some other suitable manner and a piston which slides in the cylinder and on its top is provided with supports for a vehicle.

The invention affords the advantage that the piston moves in the cylinder by means of several guides, so that greater safety in operation and longer life of the outfit are attained. Furthermore, the cylinder is in communication with means for conducting compressed air under the piston.

The guides provided between the cylinder and the piston preferably operate in different planes, and the guides, which are independent of one another, can be subdivided into partial guides.

Another feature of the invention is that two independently acting oil brakes are provided for controlling the motion of the piston, the construction being preferably such that the piston moves in the upper portion of the cylinder in suitable inserted guide members and at its lower end is provided with a pistonlike guide member which slides in the cylinder and prevents tipping of the piston and which possesses oil passages forming a part of the oil brake.

The upper end of the cylinder may be fitted with a packing for sealing the working piston and with a stripper which hugs the surface of the piston to remove impurities during the descent of the stage. The stripper edge is formed of a profiled piece of elastic material, as rubber, etc., which surrounds the piston and has stripper edge of wedgelike cross section.

By means of projections, stops, etc., arranged at the lower end of the working piston, which cooperate with parts of the cylinder, the stroke of the piston may be limited.

By way of example, the invention is illustrated in the accompanying drawing, which shows a sectional view of a lifting platform operated by means of compressed air and oil.

Referring to the drawing, the working cylinder 1 having an inwardly curved bottom 2 is disposed in a foundation let into the ground. Inside the cylinder 1 a guide ring 3 is arranged which is held in position by the screws 4 and serves as upper guide for the working piston 5. The lower open end of the piston 5 possesses welded holding pins 6 to which a head formed as piston plate 8 is secured by means of the nuts 7, the plate 8 sliding tightly in the cylinder 1 and serving as a lower piston guide having a central opening 9. Furthermore, additional passages 10 are provided in the piston head 8 in the space between the cylinder wall 1 and the piston wall 5, the passages 10 being so dimensioned that they act as a brake during the lowering motion by offering a certain resistance to the flow of the oil 11 which is greater than the escape of air. For conducting compressed air under the piston 5 on top of the liquid or oil 11 means such as a pipe 21 are provided. The pipe 21 passes through the central opening 9 which is also dimensioned so that a passage is formed between the pipe 22 and the walls of the opening to bring about a braking action during the lowering motion of the piston. On the outside of the piston 5 stops 12 are secured for limiting the stroke of the piston 5 by striking against the guide ring 3.

The piston 5 is shut off air- and liquid-tight by the covering plate 13 and the closure member 50 and supports on top the bearings 14 for the platform, not shown.

Above the guide ring 3 packings 15 are provided in the cylinder and held in position by a ring 17 attached to the cylinder by means of the screws 16. A recess of the ring 17 holds a profiled piece 18 of elastic material provided with a wedge-like elevation 19 which hugs the outer surface of the piston 5 in the manner of a stripper edge. A holding plate 20 keeps the hollow pressure member 18 in position.

A supply pipe 21 inside the cylinder extends into an ascending pipe 22 which reaches almost up to the upper closed end of the working piston 5. In the embodiment shown the cylinder and the piston 5 are not completely filled with oil. The supply piping 21 communicates with a compressed air producer during operation of which compressed air is forced under the piston cover 13 to raise the piston 5 within the cylinder 1. To prevent oil from passing into the compressed air piping 22 the upper end of the ascending pipe 22 supports an oil splash plate 51. Furthermore, the inserted guide ring 3 has a passage 52 extending into a discharge piping 53. When the lifting device is filled with oil, the piping 53 is opened to let out the air in the cylinder and thus prevent the formation of air pockets. During operation compressed air is forced through the pipes 21, 22 into the piston 5 which is thus raised. To lower the device the air is let out of the piston or cylinder, so that the piston drops down by its own weight whilst the thin channels 10 and the passage 9 have a braking effect.

I claim:

A lifting platform for vehicles, comprising an outer cylinder, a hollow piston sliding in the cylinder and closed on top, supports on the piston for holding vehicles, a liquid nearly filling the piston and cylinder, means for conducting compressed air under the piston on top of the liquid, a guide formed at the upper end of the cylinder for said hollow piston, a head provided at the lower end of the piston and extending beyond the circumference of the piston and serving as a lower piston guide, a central opening in said head, the said means for conducting compressed air passing through said central opening, said opening being so dimensioned that a passage is formed between the means for conducting compressed air and the walls of the opening, additional passages provided in the piston head in the space between the cylinder wall and the piston wall, the said central and additional passages acting as a brake during a lowering motion.

KARL KLEMM.